UNITED STATES PATENT OFFICE.

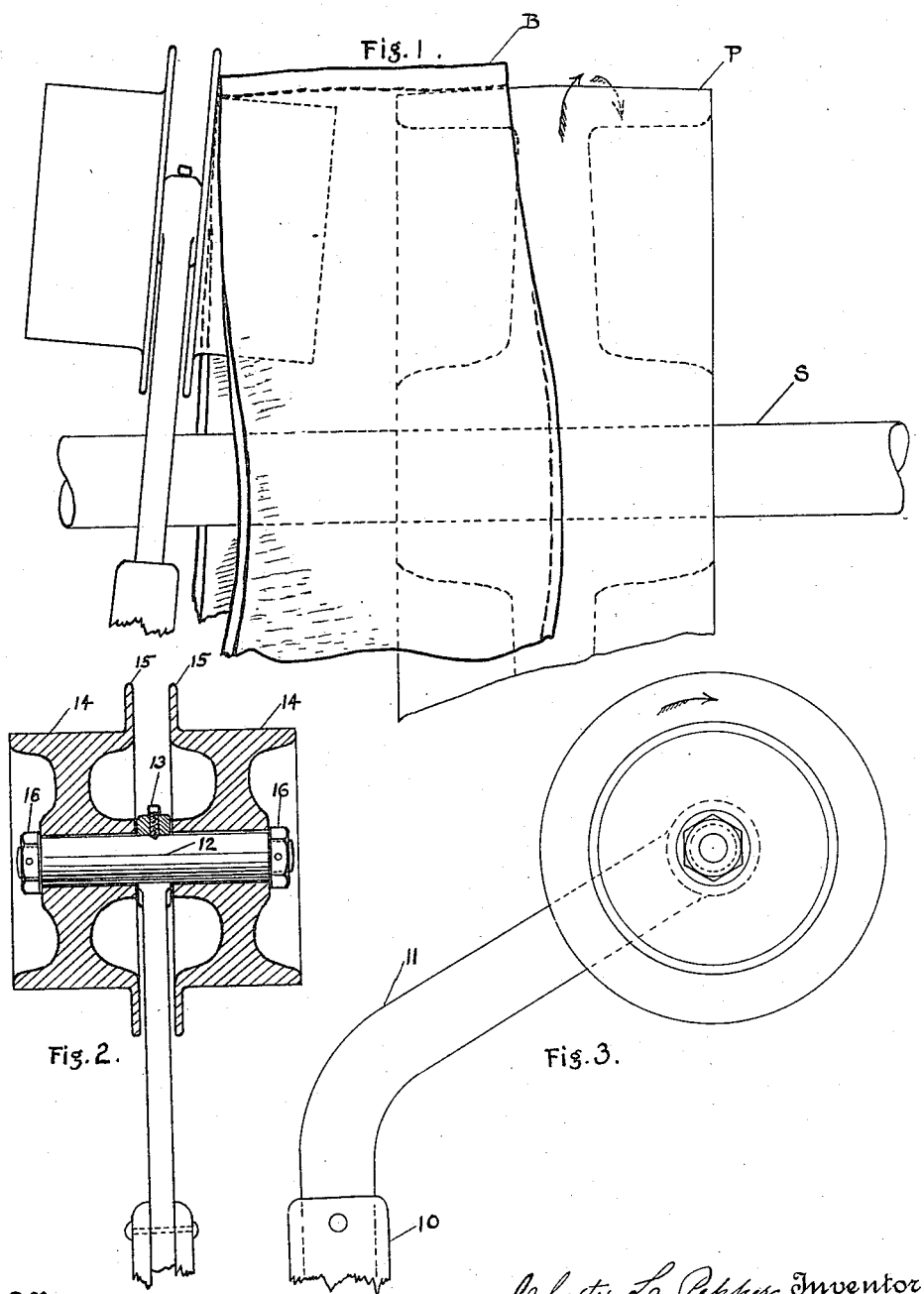

CHESTER L. PEPPER, OF CHELSEA, MASSACHUSETTS.

BELT-POLE.

1,169,565. Specification of Letters Patent. Patented Jan. 25, 1916.

Application filed February 26, 1915. Serial No. 19,857.

*To all whom it may concern:*

Be it known that I, CHESTER L. PEPPER, a citizen of the United States, and resident of Chelsea, county of Suffolk, Commonwealth of Massachusetts, have invented an Improvement in Belt-Poles, of which the following description, in connection with the accompanying drawings, is a specification, like characters on the drawings representing like parts in each of the several views.

This invention relates to devices for placing belts upon moving pulleys usually termed "belt poles," of a type adapted to engage and lift a section of a belt and guide it for engagement with the pulley while the pulley may be rapidly rotating.

A prime object of the invention is to provide a device of this type that is at once convenient to operate and that minimizes the danger often incident to this operation with the usual type of belt poles, particularly with high speed pulleys.

To this end the invention consists in the provision of a pole or standard bearing at its extremity, a pulley of substantial size with a flange at the inner side thereof, adapted to engage the belt and lift a section thereof into alinement with the live pulley whereby the belt may be readily applied to the pulley with a coöperation between the pulley to which the belt is applied, and the pulley of the belt pole that approximates the relative effect of a belt shifting between loose and tight pulleys, the relatively loose pulley of the belt pole taking up the motion of the live pulley to which the belt is being applied.

In accordance with a further feature of the invention the flanged belt applying pulley is secured to an extremity of the belt pole that is bent and laterally offset to a substantial extent from the body or main portion of the pole in a plane parallel with the axis of the belt applying pulley so that the pole extremity and the flanged pulley thereon can be carried along to some little extent should the flanged belt applying pulley strike the live pulley, until the belt applying pulley of the belt pole is out of the way of the live pulley, without having the belt pole extremity come against the shaft in a manner to cause a cantaliver action that would be apt to jerk the pole out of the hand of the user.

In accordance with a further feature of the invention the belt pole is preferably equipped with similar flanged pulleys at opposite sides thereof so that it may be used to apply a belt from either side.

The foregoing and other objects and features of the invention will be better understood from the following detailed description taken in connection with the accompanying drawings and will be thereafter pointed out in the appended claims.

Referring to the drawings: Figure 1 is an elevation showing my improved belt pole in operation applying a belt to a live pulley, the body of the belt pole proper being broken away; Fig. 2 is a sectional view of the belt pole extremity with the belt engaging pulleys thereon; and Fig. 3 is a side elevation of the operating extremity of the belt pole.

An operating shaft is indicated at S with a pulley P thereon to which the belt B is to be applied. The body or main portion of my improved belt pole is indicated at 10, the main extent thereof being broken away. The extremity 11 of the pole is bent at a substantial angle to the body portion as shown and at its end has a socket to receive a short axis bolt 12 which may be fixed thereto by a set screw 13; this axis bolt extending transversely of the plane defined by the body of the pole and the bent portion 11. For the double pulley form of the invention shown, the axis bolt 12 extends equally at both sides of the pole where it has journaled thereon the similar pulleys 14 having radial flanges 15 at their inner adjacent sides. These pulleys may be held on the axis bolt by nuts 16, this manner of mounting the pulleys being merely intended to typify any suitable way of journaling the pulleys for the action to be described, at the extremity of the belt pole. In use it will be understood that the belt will usually be picked up by the operative and applied to the live pulley while he is holding the body portion 10 of the belt pole at some little incline. A section of the belt being engaged with one of the pulleys 14 and lifted thereby, as it is applied to the live pulley P, the applying pulley 14 will instantly and readily take up the motion of the live pulley, thus as it were, simulating the coöperative relation of a shifting from a loose to a tight pulley. Thus by the pressure of the flange 15 against the edge of the belt it is transmitted to the live pulley in a quick and convenient manner and without danger to the operative. By reason of the laterally bent extremity 11 it will be understood that should the belt applying pulley 14 happen to strike the live pulley, or by the action of the belt be moved along to some little extent, the bent portion 11 extending then approximately in the direction of such movement will permit the same without any cantaliver effect on the body 10 of the pole such as would be apt to jerk it out of the hand of the operative. It will be understood that the length of the bent extremity 11 relative to the body 10 of the pole may be varied as required, this bent extremity being in all cases long enough to permit the pole extremity and the flanged pulley to carry by, as when it happens to strike the live pulley.

It will be understood that the double construction shown, with a pulley 14 at each side of the pole, is convenient for applying belts to a pulley from either side, and that this construction is especially convenient with a type of belt pole having a rigid bent extremity 11 which makes the device for a single pulley, in a way unilateral.

I do not desire to be limited to the precise structure shown as to details and therefore desire the present embodiment to be considered as illustrative and not restrictive, referring rather to the appended claims than to the foregoing description to indicate the scope of the invention.

Having described my invention, what I claim as new and desire to secure by Letters Patent is:

1. A belt pole having a pulley of substantial size journaled at its extremity with a belt applying flange at the inner side of said pulley, said pulley being comparable in dimension with the belt receiving pulleys with which the pole is to coöperate, and adapted to apply a belt in a manner similar to a shifting between loose and tight pulleys.

2. A belt pole having a pair of belt applying pulleys of substantial size journaled at its extremity, each of said pulleys having a belt applying flange at its inner side.

3. A belt pole having a laterally bent portion at its extremity constituting a rigid support for a belt applying pulley, and a pulley of substantial size journaled at the end of said bent portion with a belt applying flange at its inner side, said pulley being comparable in dimension with the belt receiving pulleys with which the pole is to coöperate, and adapted to apply a belt in a manner similar to a shifting between loose and tight pulleys.

4. A belt pole having a laterally bent portion at its extremity, and belt applying pulleys journaled at each side of the end of said bent portion, each of said pulleys having a belt engaging flange at its inner side.

In witness whereof, I have signed my name to this specification, in the presence of two subscribing witnesses.

CHESTER L. PEPPER.

Witnesses:
CLYDE L. ROGERS,
LOUISE A. JORDAN.